(12) United States Patent
Hasegawa et al.

(10) Patent No.: US 6,661,540 B1
(45) Date of Patent: Dec. 9, 2003

(54) IMAGE READING APPARATUS

(75) Inventors: Youji Hasegawa, Chichibu (JP);
Kazuhide Sugiyama, Chichibu (JP);
Masahiro Shirai, Chichibu (JP)

(73) Assignee: Canon Denshi Kabushiki Kaisha, Saitama-ken (JP)

( * ) Notice: Subject to any disclaimer, the term of this patent is extended or adjusted under 35 U.S.C. 154(b) by 0 days.

(21) Appl. No.: 09/527,685

(22) Filed: Mar. 17, 2000

(30) Foreign Application Priority Data

Mar. 24, 1999 (JP) .......................................... 11-079286

(51) Int. Cl.⁷ ................................................ H04N 1/04
(52) U.S. Cl. ....................................... 358/474; 358/497
(58) Field of Search ............................... 358/474, 505, 358/401, 501, 506, 507, 497

(56) References Cited

U.S. PATENT DOCUMENTS

| | | | | |
|---|---|---|---|---|
| 4,990,951 A | * | 2/1991 | Sanbayashi | 355/40 |
| 5,486,882 A | * | 1/1996 | Yamaguchi | 353/77 |
| 5,752,129 A | | 5/1998 | Sugiyama | 399/92 |
| 5,755,500 A | * | 5/1998 | Matsumoto | 353/25 |

FOREIGN PATENT DOCUMENTS

JP     3-231736     10/1991     ........... G03B/21/11

* cited by examiner

*Primary Examiner*—Jerome Grant, II
*Assistant Examiner*—Negussie Worku
(74) *Attorney, Agent, or Firm*—Fitzpatrick, Cella, Harper & Scinto (57) ABSTRACT

An image reading apparatus includes a transmission type projection screen capable of reading an image projected on an inner surface side of the projection screen from an outer surface side thereof, a projection optical system for projecting an image onto the inner surface side of the projection screen, and a reading unit movable in a projection optical path between the projection screen and the projection optical system for reading image information in an image reading mode. A light shield is capable of being moved to a position where an ambient light incident from the outer surface side of the projection screen, reflected by the projection optical system and entered into the reading unit, is blocked in the image reading mode.

8 Claims, 9 Drawing Sheets

START READING AND MOVING

FIG. 8B

DURING READING AND MOVING IN SUB-SCANNING DIRECTION

FIG. 8C

STOP READING AND MOVING

MOVEMENT OF LIGHT SHIELDING MEMBER

FIG. 8D

RESTART READING AND MOVING IN SUB-SCANNING DIRECTION

FIG. 8E

COMPLETE READING AND MOVING

IMAGE READING APPARATUS

BACKGROUND OF THE INVENTION

1. Field of the Invention

The present invention relates to an image reading apparatus including a transmission type projection screen for reading an image projected on an inner surface side of the screen from an outer surface side thereof, a projection optical system for projecting an image onto the inner surface side of the projection screen, and a reading sensor moved across a projection optical path and in a sub-scanning direction orthogonal to a main scanning direction, for reading the projected image in an image reading mode.

2. Related Background Art

Typical examples of the above-mentioned image reading apparatus include a microfilm reader or a microfilm reader printer which has an image reading function.

This comprises a transmission type projection screen, a projection optical system for enlarging and projecting the image of a microfilm onto an inner surface of the projection screen, and a reading sensor moved across a projection optical path and in a sub-scanning direction orthogonal to a main scanning direction for reading projected image information in an image reading mode.

In a reader mode, the reading sensor is moved to a retreat position outside the projection optical path of the projection optical system and is held in the stop and standby state such that the image of the microfilm, which is enlarged and projected onto the inner surface of the projection screen, can be read from the outer surface side of the projection screen.

In the image reading mode, the reading sensor is moved and driven in the sub-scanning direction across the projection optical path from the retreat position outside the projection optical path of the projection optical system. Consequently, the projected image information of the microfilm on the projection screen is photoelectrically read.

The image information thus photoelectrically read is transferred to a printer section, and is then output as a hard copy through an image forming operation, or is recorded and stored in a memory section.

In such an image reading apparatus, the projection screen is of a transmission type. Therefore, in the image reading mode, unnecessary ambient light that transmissively enters into the inside of the projection screen from the outside thereof is entered into the reading sensor while overlapping with a normal projected image information light, resulting in deterioration in the quality of the read image or copied image in some case.

As described in Japanese Patent Application Laid-Open No. 3-231736, a light shielding member (shutter) of a double door type is provided on each of the right and left at the inside of the projection screen and is closed in an image reading mode to wholly cover the inner surface of the projection screen, thereby shielding an ambient light which is entered into the inside of the projection screen from the outside thereof.

Moreover, there has also been known a method in which a slit and a mirror are provided so that an ambient light is not entered into the reading sensor in the image reading mode.

However, in the case in which the light shielding member of a double door type is provided as described above, it is necessary to wholly cover the projection screen. Therefore, as the projection screen has a larger size, the cost of the light shielding member or the like is increased. Accordingly, components of the apparatus cannot be provided in a portion where the light shielding member is opened or closed like a double door. Furthermore, since the whole inner surface of the projection screen is covered with the light shielding member during image reading, a displayed image plane cannot be seen.

By the arrangement of the slit and the mirror, the size of the apparatus is increased even if the ambient light is not entered into the reading sensor in the image reading mode, and furthermore, the ambient light cannot be shielded completely.

SUMMARY OF THE INVENTION

An object of the present invention is to provide an image reading apparatus capable of reliably blocking the incidence of unnecessary ambient light on a reading sensor in an image reading mode, thereby enhancing the quality of a read image or a copied image and allowing one to see a displayed image plane on a projection screen also in an image reading mode without increasing the size and cost of the image reading apparatus and changing the arrangement of a mirror of a projection optical system in a conventional apparatus.

In consideration of the above-mentioned circumstances, the present invention provides an image reading apparatus comprising a transmission type projection screen capable of reading an image projected on an inner surface side from an outer surface side, a projection optical system for projecting an image onto the inner surface side of the projection screen, reading means moved in a projection optical path between the projection screen and the projection optical system for reading the image information in an image reading mode, and light shielding means capable of being moved corresponding to a position where an ambient light incident from the outer surface side of the projection screen, reflected by the projection optical system and entered into the reading means, is blocked in the image reading mode.

According to the present invention, it is possible to properly shield the ambient light entered into the reading means in the image reading mode and to eliminate the bad influence by the incidence of the ambient light, thereby enhancing the quality of the read image.

DESCRIPTION OF THE PREFERRED EMBODIMENTS

First Embodiment

A first embodiment of the present invention will be described below with reference to FIGS. 1 to 5.

Figure 1:
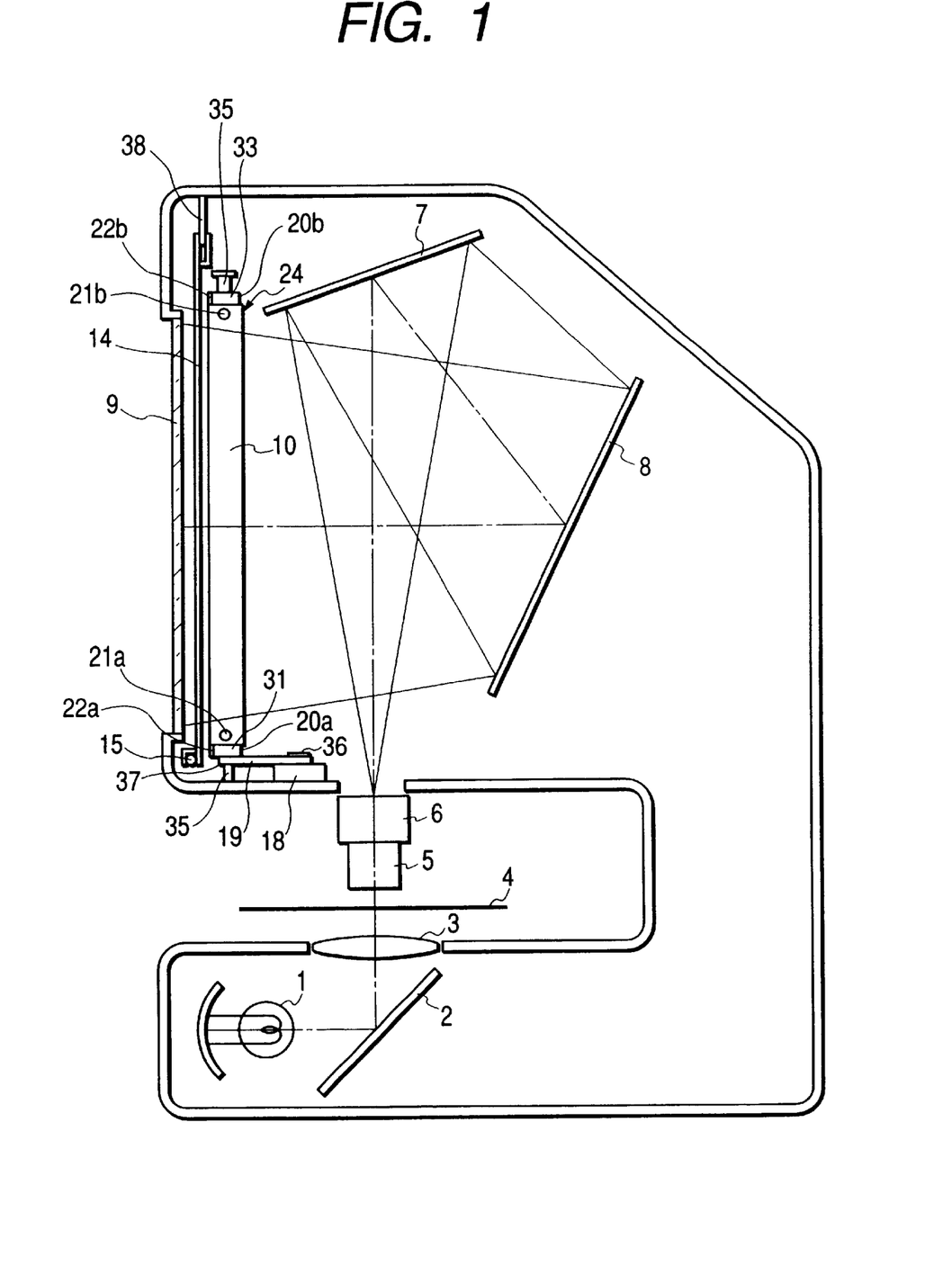
FIG. 1 is a vertical sectional side view schematically showing a microfilm reader according to a first embodiment.
Figure 2:
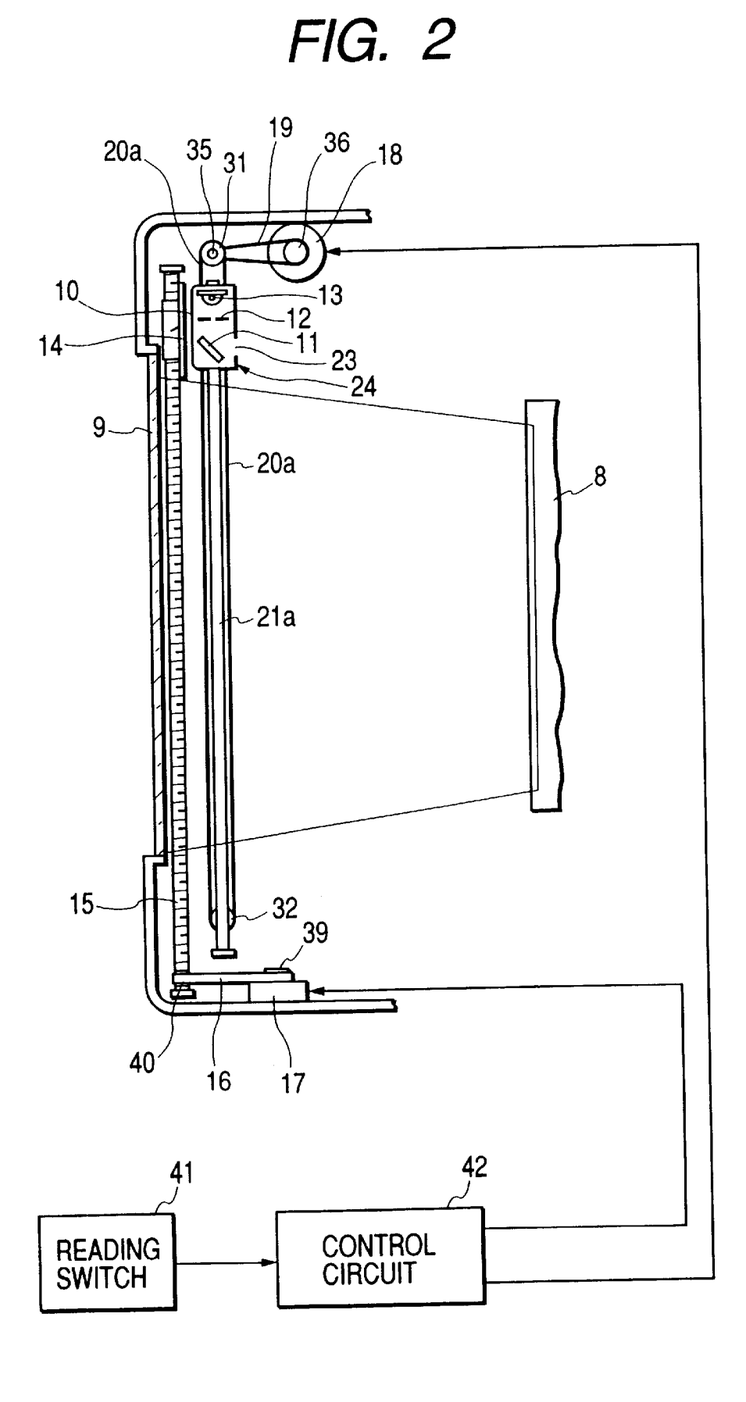
FIG. 2 is a cross-sectional plan view schematically showing a main part.
Figure 3:
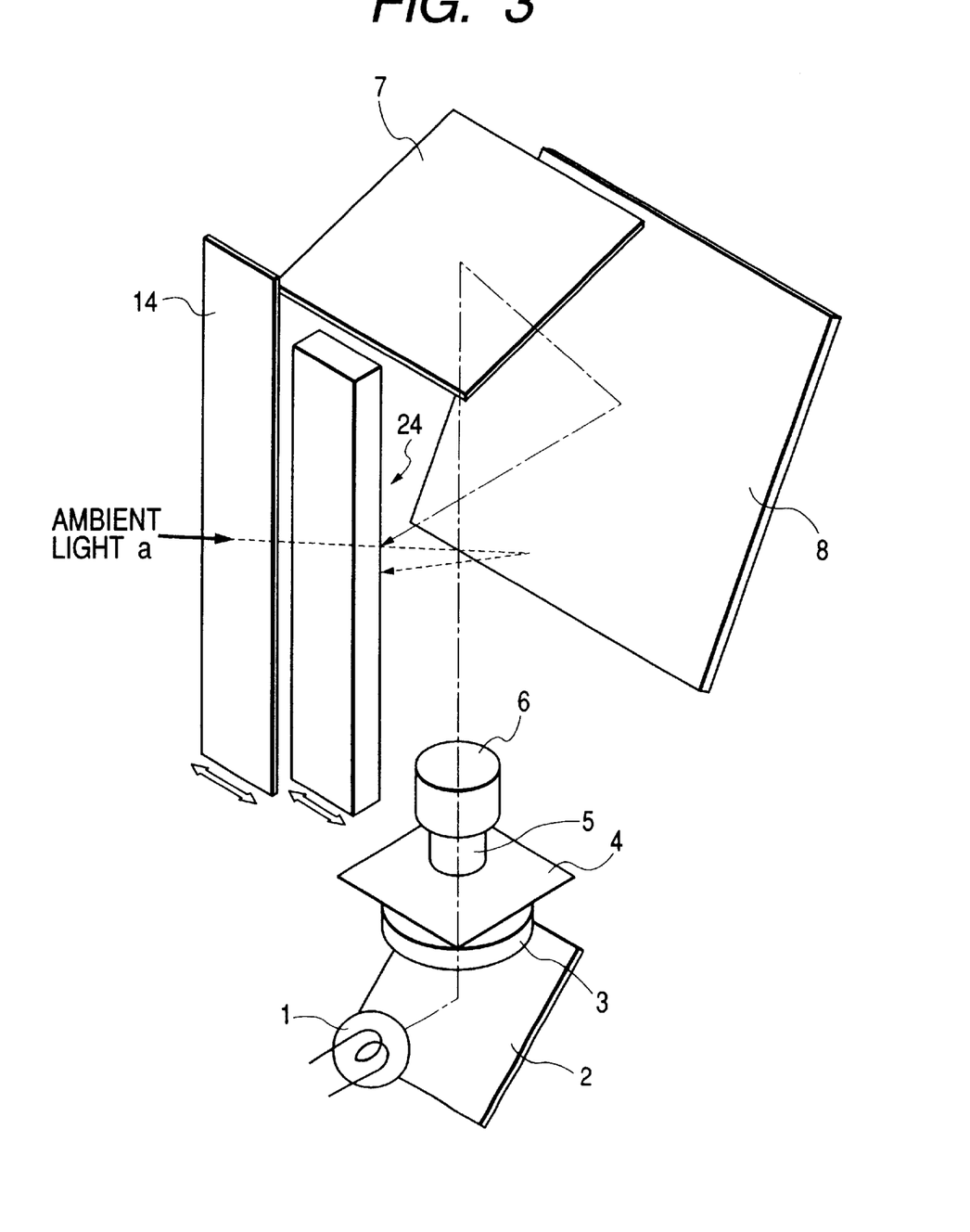
FIG. 3 is a perspective view showing a projection optical system.
Figure 4:
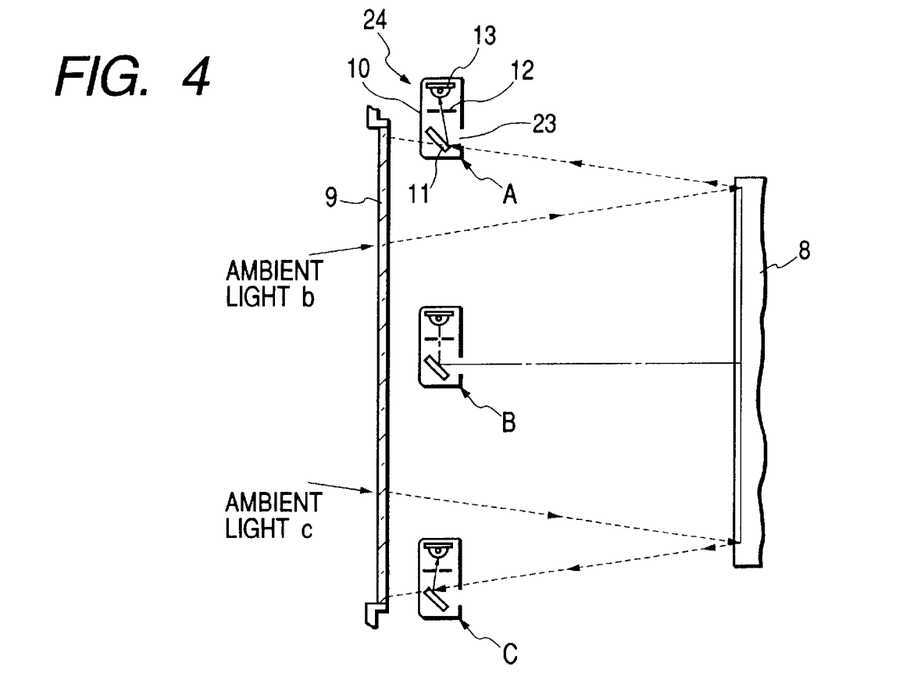
FIG. 4 is a view illustrating a movement of an image reading unit.
Figure 5:
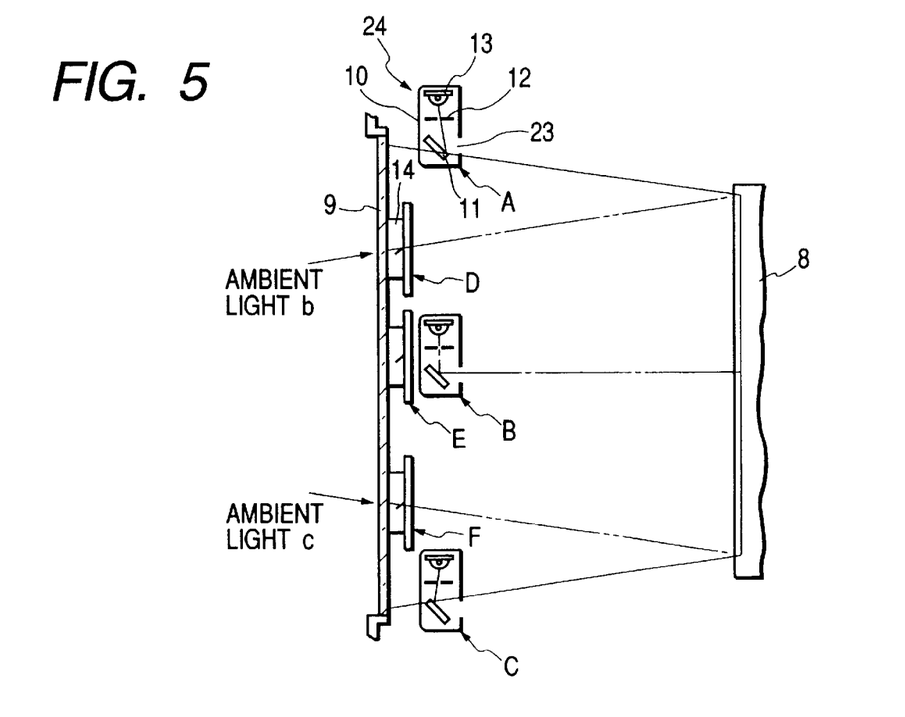
FIG. 5 is a view illustrating an interlocking movement of the image reading unit and a light shielding member.
Figure 6:
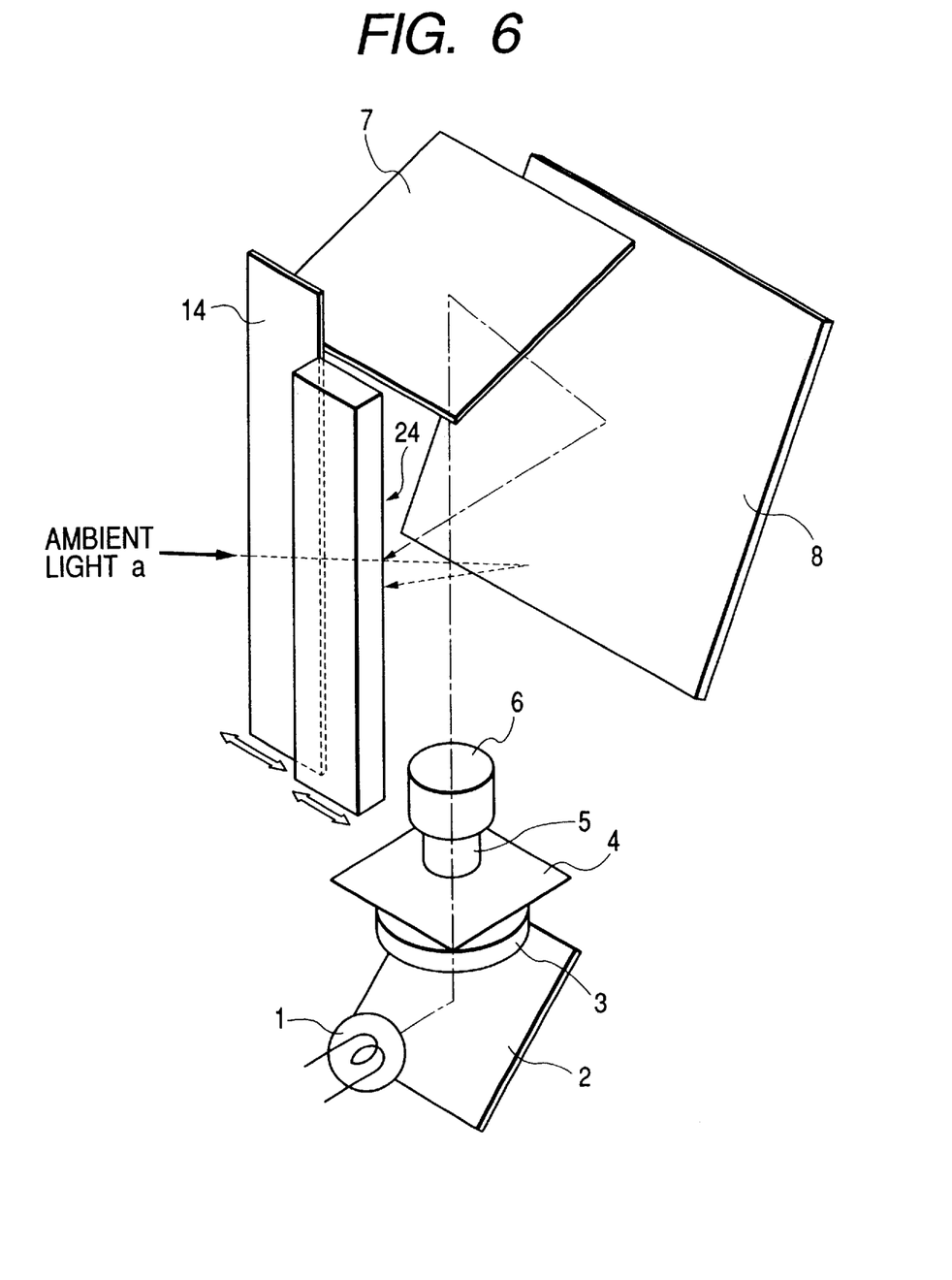
FIG. 6 is a perspective view showing a main part of a microfilm reader according to a second embodiment.

FIG. 1 is a vertical sectional side view schematically showing a microfilm reader having an image reading function as an embodiment of an image reading apparatus according to the present invention. FIG. 2 is a cross-sectional plan view schematically showing a main part. FIG. 3 is a perspective view showing a projection optical system. FIG. 4 is a view illustrating a movement of an image reading unit. FIG. 5 is a view illustrating an interlocking movement of the image reading unit and a light shielding member.

The structure of each portion of the image reading apparatus according to the present invention will be described below.

(1) Projection Optical System

The reference numeral 1 denotes a light source. The light from the light source 1 is guided to a transmission type projection screen 9 provided on the front face of a dark box portion of the apparatus through a cold mirror 2, a condenser lens 3, a microfilm 4, a projection lens 5, an image inverting prism 6, a first mirror 7 and a second mirror 8 in this order, and the enlarged and projected image of image information in the microfilm 4 is formed on the inner surface of the projection screen 9. The enlarged and projected image can be read from the outside of the projection screen 9.

The microfilm 4 is a roll microfilm or a microfiche film which is loaded into a microfilm carrier (not shown). The carrier is operated to retrieve and position a desired image information frame portion in the position of the projection lens 5. Thus, the image information of the frame portion is enlarged an projected onto the projection screen 9.

(2) Image Reading Unit and Movement Driving Mechanism Thereof

The reference numeral 24 denotes an elongated image reading unit as reading means so that the vertical direction of the projection screen 9 is set to a main scanning direction. The image reading unit 24 includes an elongated case 10 provided with a slit opening 23 in the main scanning direction, an elongated mirror 11, a filter 12, a reading sensor 13 (such as a CCD array) and the like which are arranged in the case 10 in the main scanning direction, respectively.

The image reading unit 24 has the following structure. In an attitude in which the slit opening 23 side is opened opposite to the projection screen 9 side on the inside (rear face side) of the projection screen 9, the lower and upper end sides of the image reading unit 24 respectively correspond to the lower and upper sides of the projection screen 9 and are slidably engaged with and held on lower and upper guide rail shafts 21a and 21b fixed to a chassis of the apparatus body in horizontal parallel in a transverse direction. The image reading unit 24 can be moved freely in the transverse direction of the projection screen 9 along the guide rail shafts 21a and 21b. In other words, the image reading unit 24 can be moved in a sub-scanning direction across a projection optical path.

The reference numeral 20a denotes a lower timing belt provided on the underside of the lower guide rail shaft 21a in the transverse direction in parallel with the guide rail shaft 21a. The lower timing belt 20a is wound around and stretched between right and left timing pulleys 31 and 32.

The reference numeral 20b denotes an upper timing belt provided on the upper side of the upper guide rail shaft 21b in the transverse direction in parallel with the guide rail shaft 21b. The upper timing belt 20b is wound around and stretched between right and left timing pulleys 33 (and 34, not shown).

The lower and upper side portions of the image reading unit 24 are joined and coupled to the lower and upper timing belts 20a and 20b through fixing members 22a and 22b, respectively.

By the rotation of the lower and upper timing belts 20a and 20b, accordingly, the image reading unit 24 is moved to the left or right along the projection screen 9 with respect to the guide rail shafts 21a and 21b.

The left timing pulleys 31 and 33 of the lower and upper timing belts 20a and 20b are fixed to a common vertical shaft 35. The vertical shaft 35 is rotatably provided with its upper and lower ends received by a bearing member.

The reference numeral 18 denotes a main motor. A timing belt 19 is wound around and stretched between a timing pulley 36 fixed to a rotating shaft of the main motor 18 and a timing pulley 37 fixed to the vertical shaft 35.

By the driving operation of the main motor 18, rotating force is transmitted to the lower and upper timing belts 20a and 20b through the timing pulley 36, the timing belt 19, the timing pulley 37 and the vertical shaft 35 in this order. Consequently, the image reading unit 24 is moved in the sub-scanning direction across the projection optical path.

(3) Light Shielding Member and Movement Driving Mechanism Thereof

The reference numeral 14 denotes a light shielding member which is an elongated strip-shaped sheet having a longitudinal dimension almost corresponding to the longitudinal dimension of the projection screen 9.

The light shielding member 14 is provided between the projection screen 9 and the movement path of the image reading unit 24 so that the lower and upper end sides of the light shielding member 14 respectively correspond to the lower and upper sides of the projection screen 9 and are engaged with and held on a lower ball screw 15 and an upper guide rail 38 fixed to the chassis of the apparatus body in horizontal parallel in a transverse direction.

The reference numeral 17 denotes a light shielding motor. A timing belt 16 is wound around and stretched between a timing pulley 39 fixed to a rotating shaft of the light shielding motor 17 and a timing pulley 40 fixed to the ball screw 15. These components constitute moving means for the light shielding member 14.

By the driving operation of the light shielding motor 17, rotating force is transmitted to the ball screw 15 through the timing pulley 39, the timing belt 16 and the timing pulley 40 in this order. Consequently, the light shielding member 14 can be moved freely in the transverse direction of the projection screen 9 between the inside of the projection screen 9 and the movement path of the image reading unit 24. In other words, the light shielding member 14 can also be moved across the projection optical path in the sub-scanning direction. As described above, light shielding means is constituted by the light shielding member and the moving means thereof.

(4) Interlocking Movement Control of Image Reading Unit 24 and Light Shielding Member 14 a) Operation in a Reader Mode

In a reader mode, the image reading unit 24 and the light shielding member 14 are provided on the left end sides of the lower and upper timing belts 20a and 20b and the left end side of the ball screw 15 as shown in FIG. 2, and are retreated by the operation of each of the above-described movement driving mechanisms into such a position taken as a home position that is out of the projection optical path of the projection optical system and are held in the stop and standby state.

Consequently, the enlarged and projected image of the image information in the microfilm 4 is perfectly formed on the inner surface of the projection screen 9 without the obstruction of the image reading unit 24 and the light shielding member 14. The enlarged and projected image can be read from the outside of the projection screen.

b) Operation in an Image Reading Mode

When a reading switch 41 (FIG. 2) is turned on, a signal is input to a control circuit 42 so that a control system of the apparatus is switched into an image reading mode.

The control circuit 42 serves to rotate and control the main motor 18 and the light shielding motor 17 in a predetermined manner.

The main motor 18 is forwardly rotated at a predetermined constant rotating speed, and the image reading unit 24 is moved in the sub-scanning direction in order of A, B and C shown in FIG. 4 across the projection optical path from the left side of the projection screen 9 to the right side thereof along the guide rail shafts 21a and 21b at a predetermined constant speed by means of the movement driving mechanism.

In the process of moving the image reading unit 24 in the sub-scanning direction, the enlarged and projected image light of the microfilm onto the inner surface of the projection screen 9 enters a case 10 of the image reading unit 24 through the elongated slit opening 23 in a main scanning direction and is entered into the reading sensor 13 through the mirror 11 and the filter 12 so that it is photoelectrically read in the main scanning direction. A read signal thus obtained is transmitted to a signal processing circuit which is not shown.

An optical path length from the microfilm 4 to the projection screen 9 is set equal to an optical path length from the microfilm 4 to the reading sensor 13 of the image reading unit 24. If an image on the projection screen 9 is precisely focused, an image on the reading sensor 13 is also focused precisely.

When the image reading unit 24 reaches a predetermined going end position on the right side of the projection screen 9 to end the image reading operation, the main motor 18 is switched to perform reverse rotation. Consequently, the image reading unit 24 is caused to perform a returning operation and is moved back to the original home position, and is held in the stop and standby state on the home position until the reading switch 41 is turned on again.

The elongated slit opening 23 acting as an image light incidence aperture of the image reading unit 24 has a width which is as small as possible. However, in the case in which any countermeasure for shielding the ambient light entered into the inner surface side of the projection screen 9 from the outer surface side thereof is not taken, an ambient light other the normal enlarged and projected image light, which is entered into the inner surface side of the projection screen 9 from the outer surface side thereof and is reflected onto the projection screen 9 by the second mirror 8, is entered into the slit opening 23 while overlapping therewith in the process of the movement of the image reading unit 24 in the sub-scanning direction in the image reading mode. Therefore, the slit is insufficient to completely prevent the ambient light b, c from being entered into the reading sensor 13 as shown in FIG. 4, for example.

In the present embodiment, when the reading switch 41 (FIG. 2) is turned on so that the control system is switched into the image reading mode, the light shielding motor 17 is forwardly rotated by the control circuit 42 and the light shielding member 14 is moved in the sub-scanning direction in order of D, E and F shown in FIG. 5 across the projection optical path from the left side of the projection screen 9 to the right side thereof by the movement driving mechanism.

By the movement of the light shielding member 14 in the sub-scanning direction, a portion of the ambient light entered into the inner surface side of the projection screen 9 from the outer surface side thereof, which is entered into the image reading unit 24, is always shielded during the movement of the image reading unit 24 interlockingly therewith.

More specifically, the shadow of the movable light shielding member 14 is projected on the image reading unit 24 including the reading sensor 13. The movable light shielding member 14 is moved in the sub-scanning direction interlockingly with the movement of the image reading unit 24 in order to always shield the ambient light portion for the image reading unit 24 in the image reading mode. Consequently, the incidence of the unnecessary ambient light b, c can be blocked reliably. Accordingly, it is possible to enhance the quality of the read image or the copied image by eliminating the bad influence of the incidence of the ambient light.

The movable light shielding member 14 can be formed of a sheet having a width which is as small as possible to sufficiently shield only the ambient light portion corresponding to the image reading unit 24. Consequently, even if the projection screen 9 becomes larger, the cost is not increased, and furthermore, the arrangement of the mirror of the projection optical system in the conventional apparatus does not need to be changed and the size of the apparatus is not increased because the movement of the movable light shielding member 14 is carried out across the projection optical path.

Also in the image reading mode, an image is projected onto the inner surface portion of the projection screen other than the inner surface portion of the projection screen corresponding to the light shielding member 14 having a small width which is moved in the sub-scanning direction. Therefore, the displayed picture plane can be seen on the projection screen also in the image reading mode.

In the apparatus having such a structure that the transverse direction of the projection screen 9 is set to the main scanning direction and the image reading unit 24 is moved in the vertical direction with respect to the projection screen 9 to read the enlarged and projected image in the sub-scanning direction, it is preferable that the light shielding member 14 should also be moved in the sub-scanning direction vertically with respect to the projection screen 9 interlockingly with the movement of the image reading unit 24.

The movement driving mechanisms of the image reading unit 24 and the light shielding member 14 can be provided optionally. The movement driving mechanism in the light shielding member 14 may be a timing belt type mechanism. The movement driving mechanism in the image reading unit 24 may be a ball screw type mechanism.

Second Embodiment

While the light shielding member 14 is provided between the projection screen 9 and the movement path of the image reading unit 24 in the apparatus according to the first embodiment, the light shielding member 14 is provided between the movement path of the image reading unit 24 and the second mirror 8 as shown in FIGS. 6, 7 and 8A to 8E in the present embodiment.

Figure 7:
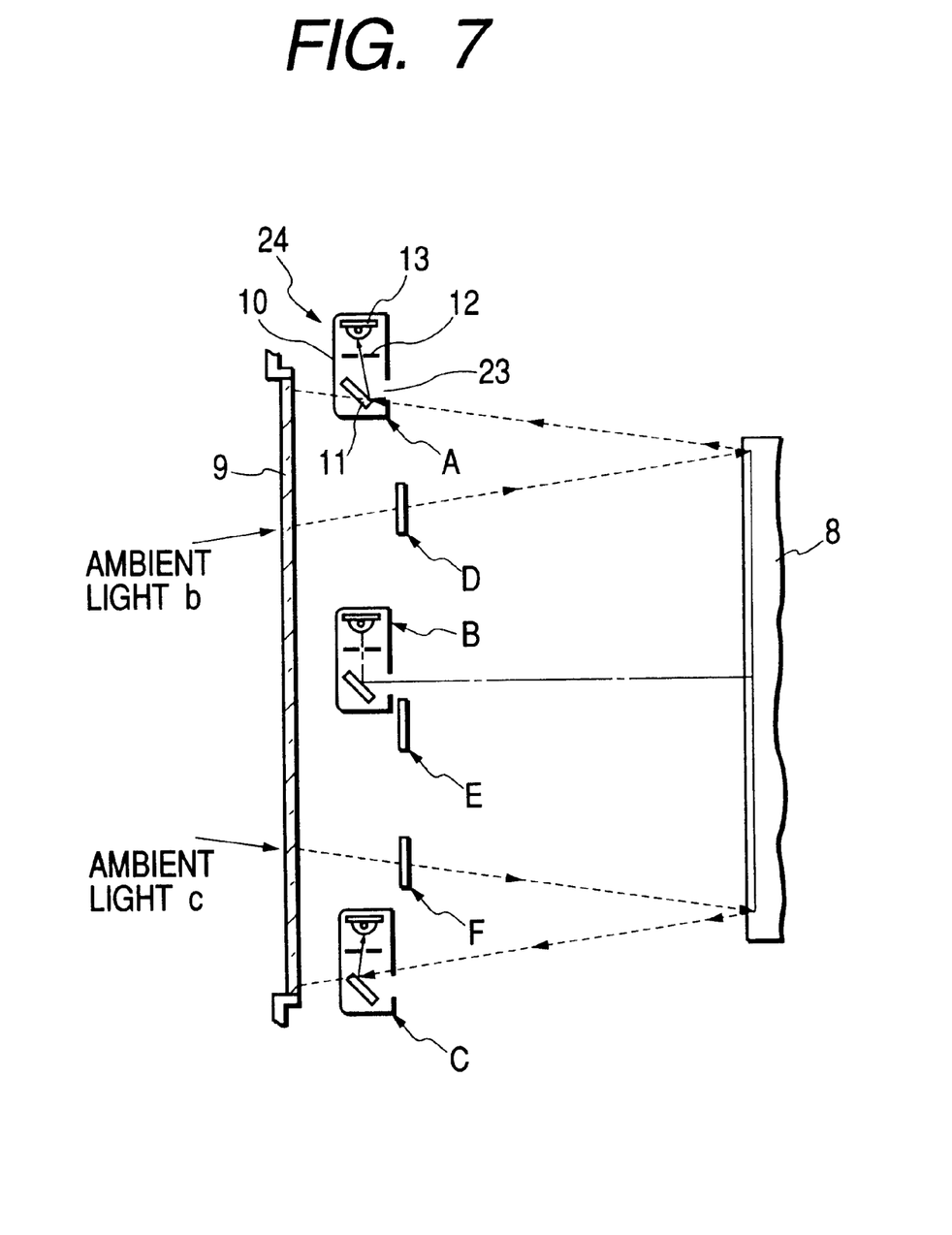
FIG. 7 is a view illustrating an interlocking movement of an image reading unit and a light shielding member.
Figure 8A:
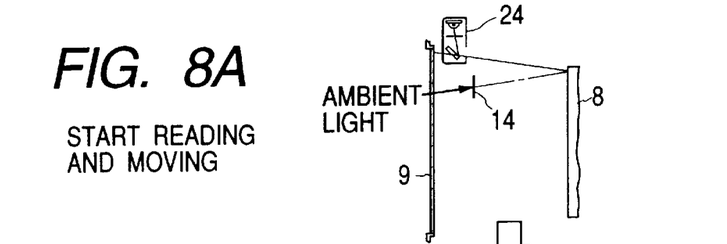
FIGS. 8A, 8B, 8C, 8D and 8E are views illustrating the interlocking movement of the image reading unit and the light shielding member.
Figure 8B:
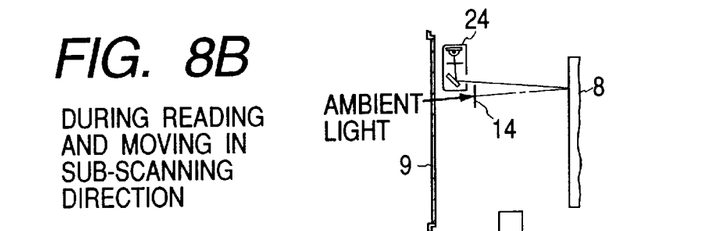
Figure 8C:
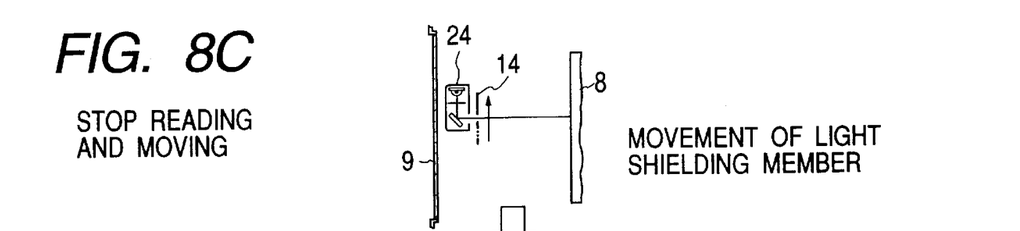
Figure 8D:
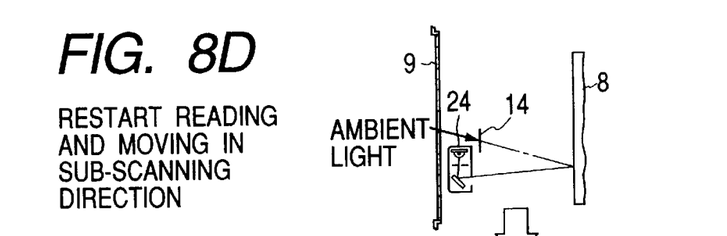
Figure 8E:
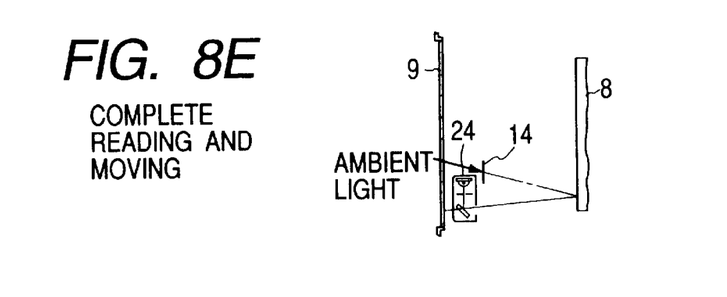

As shown in FIG. 7, when the image reading unit 24 is moved in a sub-scanning direction in order of A, B and C, the light shielding member 14 is interlockingly moved in order of D, E and F. In this case, when movement is carried out from the positions of B and E to the positions of C and F, the image reading unit 24 intersects the light shielding member 14 and the light shielding member 14 is moved between the image reading unit 24 and the second mirror 8. Consequently, a reading optical path is temporarily interrupted.

In this case, the following countermeasure is taken. In the present embodiment, the reading and moving operations of the image reading unit 24 are temporarily stopped during the intersection (FIG. 8C) to perform control such that the light shielding member 14 is intersected from a position shown in a two-dot dashed line to a position shown in a solid line in the drawings, gets out of a reading optical path and then restarts the reading operation in the process of the movement of the image reading unit 24 and the light shielding member 14 as shown in FIGS. 8A to 8E in the present embodiment. Consequently, it is possible to obtain the same effects as in the apparatus according to the first embodiment.

Third Embodiment

Figure 9:
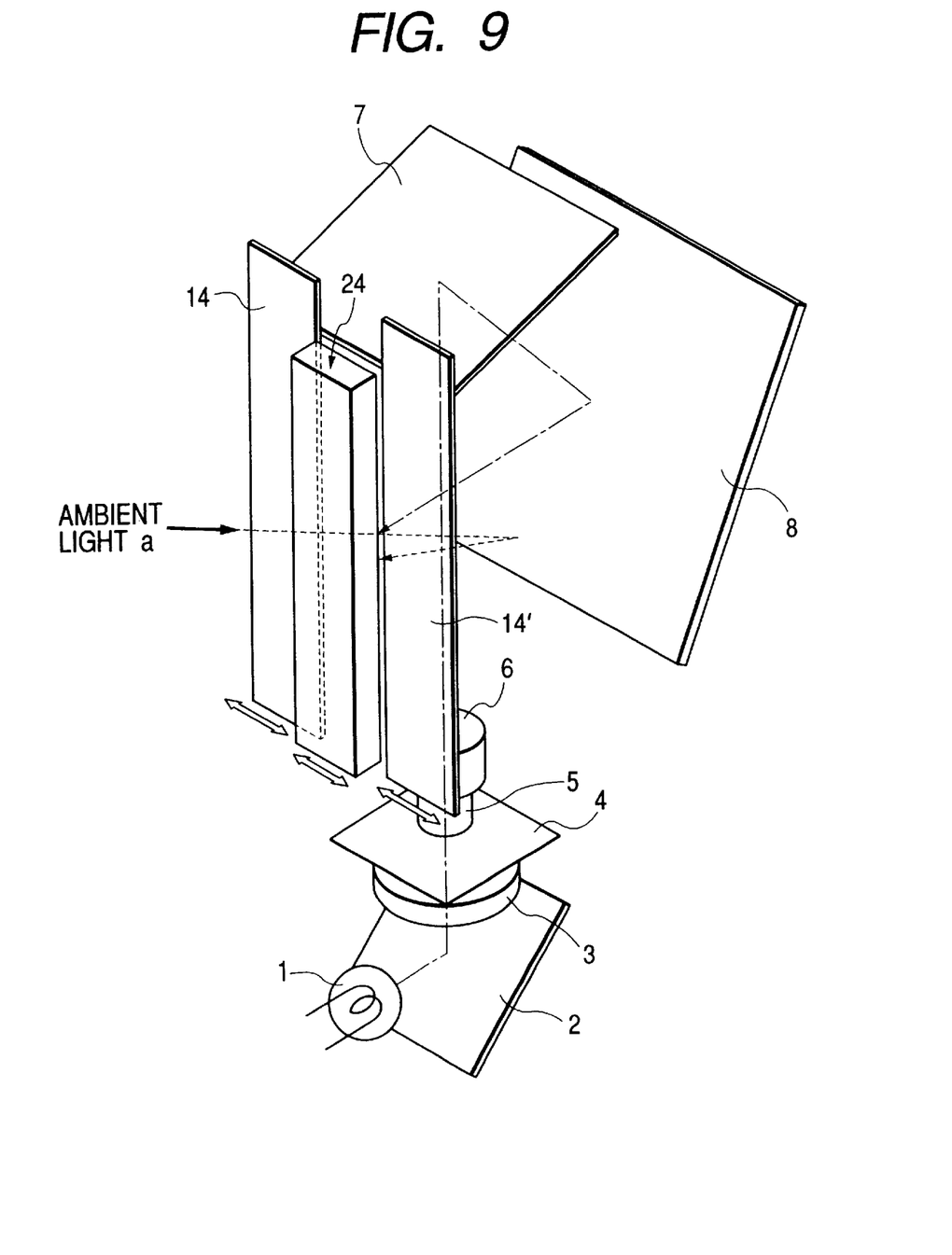
FIG. 9 is a perspective view showing a main part of a microfilm reader according to a third embodiment.

In the present embodiment, first and second light shielding members 14 and 14' are provided on right and left sides of the image reading unit 24 in the apparatus according to the second embodiment, which will be described with reference to FIG. 9.

In the apparatus according to the second embodiment, it is necessary to perform control to temporarily stop the image reading unit 24 when the image reading unit 24 intersects the light shielding member 14. In order to eliminate the control, the first light shielding member 14 should block an ambient light on the left side of a projection screen and the second light shielding member 14' should block an ambient light on the right side of the projection screen.

In order to individually control the first and second light shielding members 14 and 14' the ball screw 15 of the movement driving mechanism in the light shielding member 14 according to the first embodiment should be divided into two portions and a driving system should be provided on the right and left sides.

In this case, it is apparent that the first and second light shielding members 14 and 14' are operated interlockingly with the image reading unit 24. The light shielding members 14 and 14' can also be provided on the right and left sides in the apparatus according to the first embodiment.

Fourth Embodiment

Figure 10:
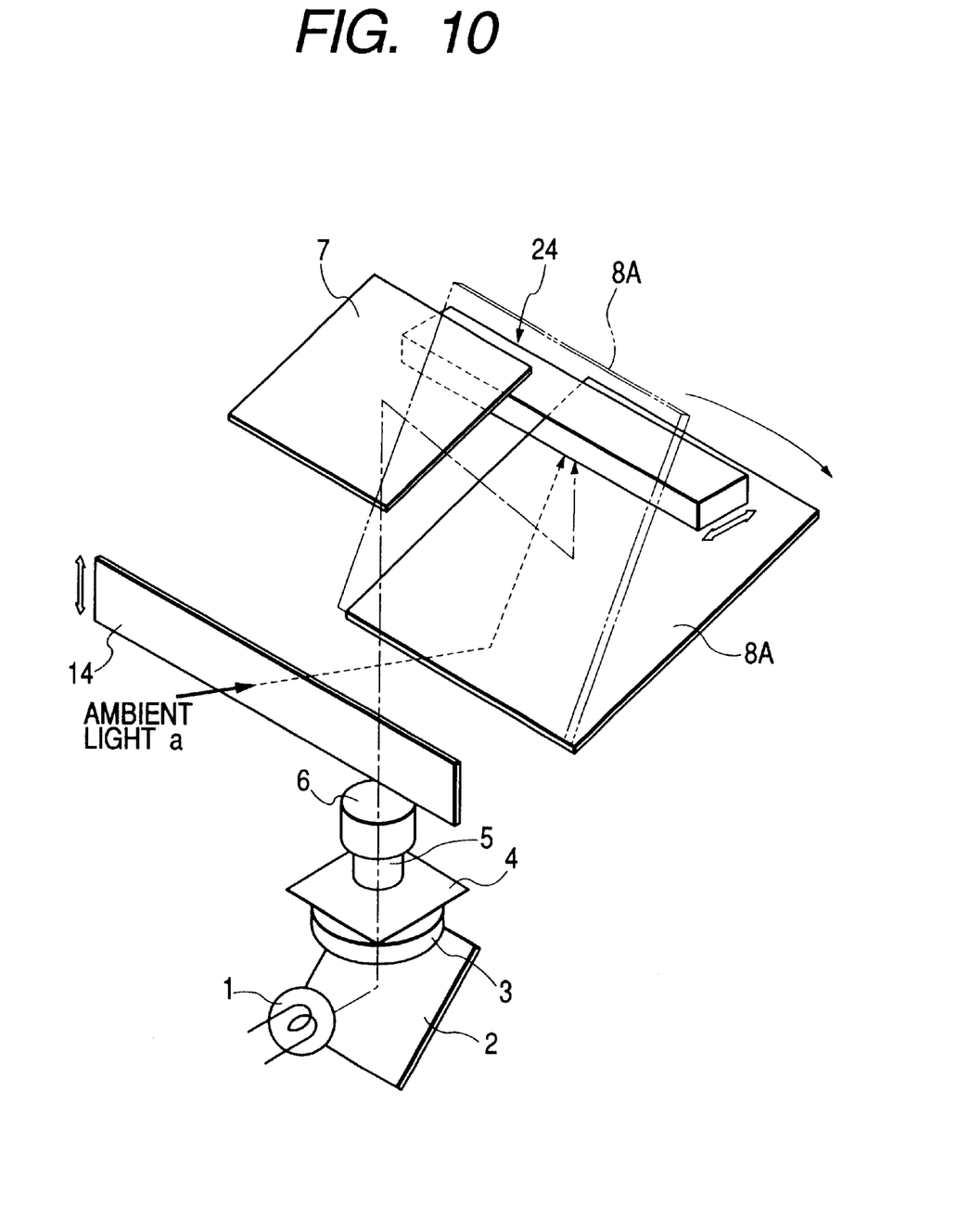
FIG. 10 is a perspective view showing a main part of a microfilm reader according to a fourth embodiment.

FIG. 10 shows an example in which a light shielding member 14 is provided in an image reading apparatus having a mirror 8A for switching an optical path.

In a reader mode, a second mirror 8A is switched and held in an attitude position shown in a two-dot dashed line to reflect and project a projected image light from a first mirror 7 toward a projection screen 9. In an image reading mode, the second mirror 8A is switched and held in an attitude position shown in a solid line to reflect the projected image light from the first mirror 7 toward an image reading unit 24.

According to the present embodiment, in the case in which the rear face of the projection screen is provided with the light shielding member 14 for being operated interlockingly with the image reading unit 24 disposed on an upper portion of the second mirror 8A having an optical path switched even if the image reading unit 24 is not provided on the rear face of the projection screen, the same effects as in the first embodiment can be obtained.

Moreover, the present invention can also be applied to various arrangements of the optical path.

According to the present invention described above, the image reading apparatus having an image reading function can reliably block the incidence of an unnecessary ambient light on the reading sensor in the image reading mode, thereby enhancing the quality of a read image or a copied image without increasing the size and cost of the image reading apparatus and changing the arrangement of a mirror of a projection optical system in a conventional apparatus.

Also in the image reading mode, the displayed image plane can be seen on the projection screen.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. An image reading apparatus comprising:
   a transmission type projection screen through which an image projected on an inner surface side of the projection screen is readable from an outer surface side thereof;
   a projection optical system for projecting an image onto the inner surface side of the projection screen;
   a reading unit movable in a projection optical path between the projection screen and the projection optical system for reading image information in an image reading mode;
   a light shield in the projection optical path between the projection screen and the projection optical system, said light shield being movable to a position where an ambient light incident from the outer surface side of the projection screen, reflected by the projection optical system and entered into the reading unit, is blocked;
   a motor for moving the light shield; and
   a controller for controlling the motor to move the light shield to the position corresponding to a position of the reading unit in the image reading mode where the ambient light is blocked,
   wherein the reading unit has a length over a main scanning direction of the projection screen and is moved in a sub-scanning direction orthogonal to the main scanning direction, and
   wherein the light shield has a length over the main scanning direction and is moved in parallel with the projection screen in the sub-scanning direction.

2. An image reading apparatus according to claim 1, wherein the reading unit and the light shield are retreated into a position which is out of the projection optical path when the image reading mode is not set.

3. An image reading apparatus according to claim 1, wherein the light shield is provided in a projection optical path between the projection screen and the reading unit.

4. An image reading apparatus according to claim 1, wherein the light shield is provided in a projection optical path between the reading unit and the projection optical system.

5. An image reading apparatus according to claim 4, wherein moving and reading operations of the reading unit are temporarily stopped when the light shield passes through the projection optical path between the reading unit and the projection optical system.

6. An image reading apparatus according to claim 5, wherein the reading unit and the light shield are moved in a first direction in the image reading mode and the light shield is moved in a second direction opposite to the first direction to pass through the projection optical path between the reading unit and the light shield when the moving and reading operations of the reading unit are temporarily stopped.

7. An image reading apparatus according to claim 4, wherein the light shield includes two members which are provided on upstream and downstream sides in a direction of the movement of the reading unit.

8. An image reading apparatus according to claim 1, wherein the projection optical system switches the projection optical path between a reader mode for projecting an image onto the projection screen and the image reading mode.

* * * * *

UNITED STATES PATENT AND TRADEMARK OFFICE
CERTIFICATE OF CORRECTION

PATENT NO. : 6,661,540 B1 Page 1 of 1
APPLICATION NO. : 09/527685
DATED : December 9, 2003
INVENTOR(S) : Youji Hasegawa et al.

It is certified that error appears in the above-identified patent and that said Letters Patent is hereby corrected as shown below:

COLUMN 5:

Line 51, "other" should read --other than--.

Signed and Sealed this

Seventh Day of November, 2006

JON W. DUDAS
*Director of the United States Patent and Trademark Office*